United States Patent [19]

Ikuta et al.

[11] Patent Number: 4,503,457
[45] Date of Patent: Mar. 5, 1985

[54] TINT LAYING DEVICE FOR USE IN A PICTURE REPRODUCING MACHINE

[75] Inventors: Kunio Ikuta, Nagaokakyo; Hitomi Atoji, Kyoto, both of Japan

[73] Assignee: Dainippon Screen Seizo Kabushiki Kaisha, Japan

[21] Appl. No.: 248,896

[22] Filed: Mar. 30, 1981

[30] Foreign Application Priority Data

Apr. 3, 1980 [JP] Japan ................................ 55-43913

[51] Int. Cl.$^3$ ............................................. H04N 1/46
[52] U.S. Cl. .................................................. 358/75
[58] Field of Search ........................................ 358/75

[56] References Cited

U.S. PATENT DOCUMENTS 4,369,461  1/1983  Tamura ................................ 358/75

Primary Examiner—Richard Murray
Attorney, Agent, or Firm—Schwartz & Weinrieb

[57] ABSTRACT

A tint laying device for use in a picture reproducing machine, wherein a pickup head scans an original picture to pick up a picture signal and sends it to a color discriminator which discriminates a color in hue of the picture signal to output a discrimination signal to a halftone dot area rate controller, wherein the controller outputs a signal corresponding to a halftone dot area rate predetermined of a halftone dot to be recorded, per each color, to an exposure amount controller which varies the brightness corresponding to the halftone dot area rate depending on the signal output from the controller, and wherein an exposure head scans a recording film and records a reproduction picture thereon according to the halftone dot area rate in synchronization with the pickup head. This device is capable of performing an accurate and quick operation without any skill.

4 Claims, 7 Drawing Figures

TINT LAYING DEVICE FOR USE IN A PICTURE REPRODUCING MACHINE

BACKGROUND OF THE INVENTION

The present invention relates to a tint laying device for use in a picture reproducing machine such as a color scanner and a color facsimile.

When a color original picture is reproduced, for example, by printing, color separation densities of patterns of the original picture are determined by halftone dot area rates of printing plates.

For example, when an original picture 1 shown in FIG. 1, wherein a bill part 1a, a head part 1b, a body part 1c, wing parts, a cap part 1d, and a tassel part 1e of the cap of the original picture 1 are composed of 90% of yellow and 20% of magenta components, 30% of yellow and 50% of cyan components, 30% of yellow and 50% of cyan components, 50% of cyan and 50% of magenta components, 50% of yellow and 50% of magenta components, and 30% of cyan component, respectively, is printed by using color separation printing plates for yellow, magenta, cyan and black, hereinafter referred to as Y plate, M plate, C plate and K plate, each part is printed by the Y plate, M plate and/or C plate having the halftone dot area rates corresponding to the percentages of the color components, i.e. the bill part 1a by the K and the M plates having 90% and 20% of halftone dot area rates, respectively.

Therefore, the Y plate is so prepared that the halftone dot area rates of the bill and the head, the body and the cap parts 1a, 1b, 1c and 1d may be 90%, 30%, 30% and 50%, respectively. Thus, in the conventional method, the tint laying halftone screens 2 having the halftone dot area rates of 90%, 30% and 50% are cut away in the shapes of the bill, the head, the body and the cap parts. Then, the halftone screens 2 cut away are disposed to a base sheet 3, as shown in FIG. 2a, and then are photographed to obtain the Y plate. The other plates, M plate, C plate and K plate, are obtained by arranging the tint laying halftone screens 2 cut away in the necessary forms on the base sheets, as shown in FIGS. 2b, 2c and 2d, and photographing them, in the same manner as described above.

However, such a tint laying operation is rather a troublesome operation which requires high skill and a lot of patience, and in this operation the costly halftone screens having different halftone dot area rates are consumed in great quantities.

SUMMARY OF THE INVENTION

It is an object of the present invention to provide a tint laying device for use in a picture reproducing machine free from the aforementioned defects, which is semiautomatic and is capable of performing an accurate, economic, easy and quick operation without any skill.

According to the present invention there is provided a tint laying device for use in a picture reproducing machine, comprising (a) a pickup head which scanns an original picture and picks up a picture signal, (b) a color discriminator which receives the picture signal output from the pickup head, and discriminates a color in hue of the picture signal to output a discrimination signal, (c) a halftone dot area rate controller which receives the discrimination signal fed from the color discriminator, and outputs a signal corresponding to a halftone dot area rate predetermined of a halftone dot to be recorded, per each color, (d) an exposure amount controller which varies the halftone dot area rate of the halftone dot depending on the signal output from the halftone dot area rate controller, and (e) an exposure head which scanns a recording film and records a reproduction picture thereon according to the halftone dot area rate in synchronization with the pickup head.

BRIEF DESCRIPTION OF DRAWINGS

Other objects and features of the present invention will become clear from the following description of a preferred embodiment of the present invention with reference to the accompanying drawings, in which.

DESCRIPTION OF A PREFERRED EMBODIMENT

Figure 3:
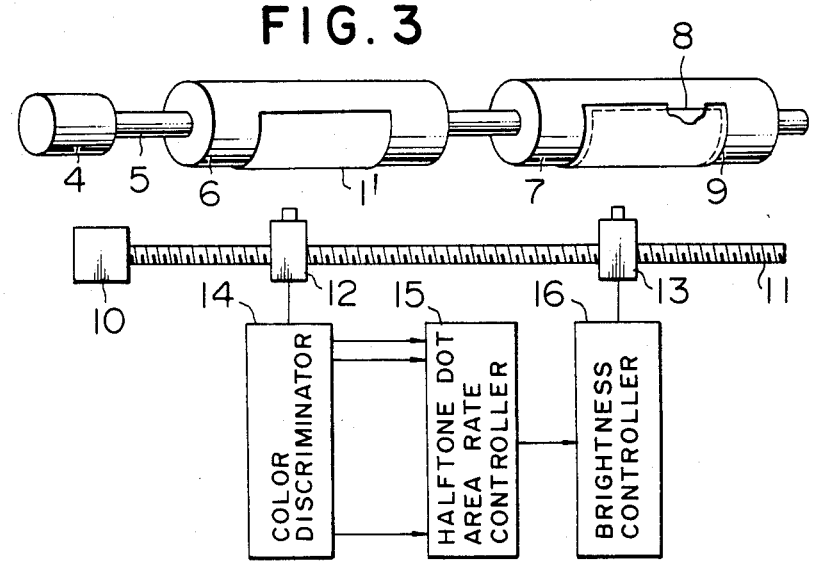
FIG. 3 is a block diagram of a tint laying device according to the present invention.

Referring to the drawings there is shown in FIG. 3 a device according to the present invention. An original picture cylinder 6 and a recording cylinder 7 are coaxially arranged onto a drive shaft 5 which is rotated by a drive motor 4 connected thereto.

Figure 1:
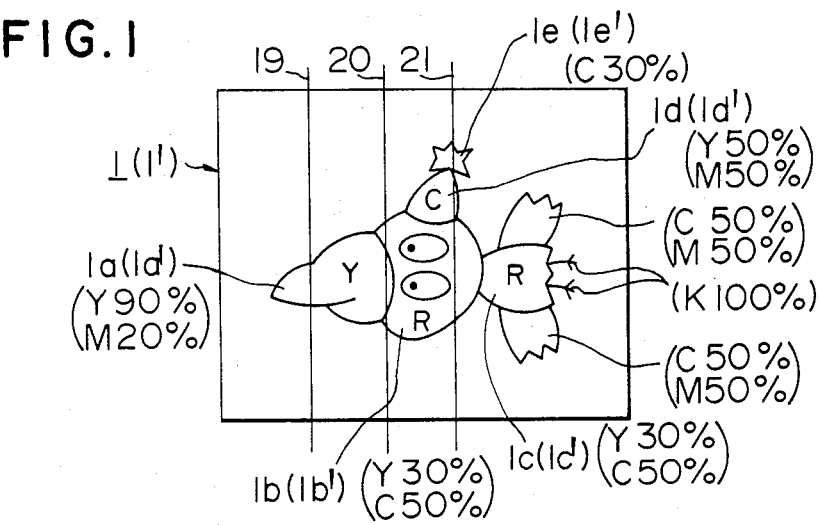
FIG. 1 is a schematic view of an original picture to be processed.
Figure 2A:
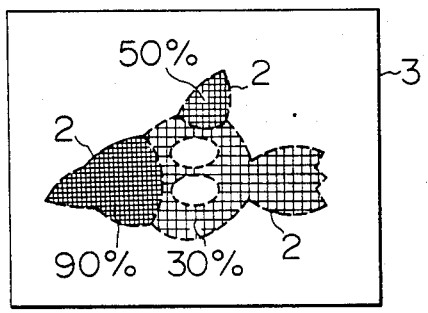
FIGS. 2a, 2b, 2c and 2d show arrangements of tint laying halftone screens cut away in the necessary forms on base sheets for Y, M, C and K plates.
Figure 2B:
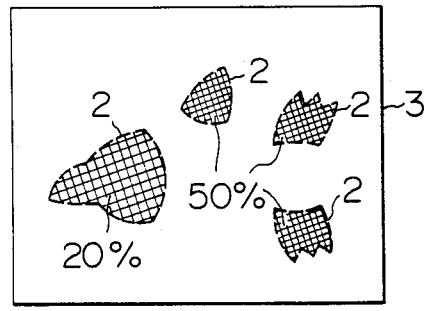
Figure 2C:
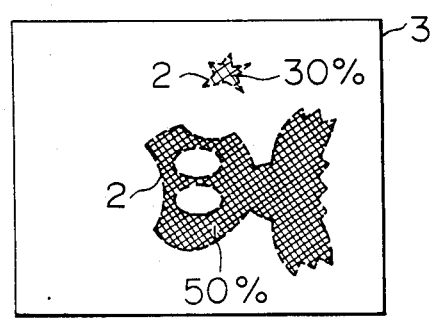
Figure 2D:
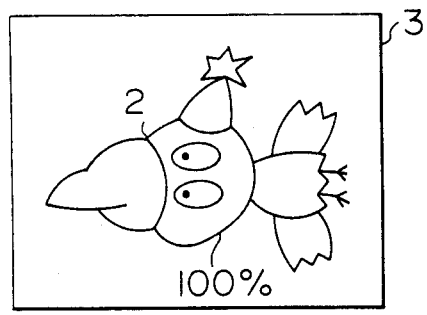

Onto the picture cylinder 6 and the recording cylinder 7 an original picture 1' having the same pattern as the one 1 shown in FIG. 1, and a recording film 8 are to be secured, and the recording film 8 is covered by a halftone cantact screen 9.

In this case, the ground color of the original picture 1' is white, and the hue of the original picture 1' is unrelated to the hue and the density of a reproduction picture printed. Further, the portions of the original picture, corresponding to those having somewhat different colors in hue of the printed picture are painted in different colors in hue.

In this embodiment, the bill part 1a', the head and the body parts 1b' and 1c', and the cap part 1d' of the original picture of FIG. 1, including the yellow components of different densities, are painted out in yellow, red and blue colors, hereinafter referred to as Y, R and B colors.

A screw rod 11 driven by a motor 10 is arranged in parallel with the drive shaft 5. A pickup head 12 and an exposure head 13 facing the picture cylinder 6 and the recording cylinder 7, respectively, are movably mounted onto the screw rod 11 so that the two heads 12 and 13 may scan the entireties of the original picture 1' and the recording film 8 so as to pick up picture signals from the original picture and to expose the recording film 8.

According to the present invention, of course, the combination of the picture cylinder 6 and the pickup head 12, and the combination of the recording cylinder 7 and the exposure head 13 may be driven separately in synchronization with each other.

A color discriminator 14 discriminates a color in hue of the picture signal of the pickup head 12 irrespective of the density of each color and outputs a discrimination signal having a certain level. One embodiment of this color discriminator 14 is disclosed in Japanese Patent Publication No. 50-14845, and this kind of color discriminator can usually discriminate twelve colors in hue.

A halftone dot area rate controller 15 receives the discrimination signal sent from the color discriminator 14 and outputs a signal corresponding to a halftone dot area rate predetermined of a halftone dot to be recorded on the recording film, per each color. A brightness controller 16 varies the halftone dot area rate or the brightness of a lamp (not shown) contained in the exposure head 13 depending on the signal output from the halftone dot area rate controller 15.

Figure 4:
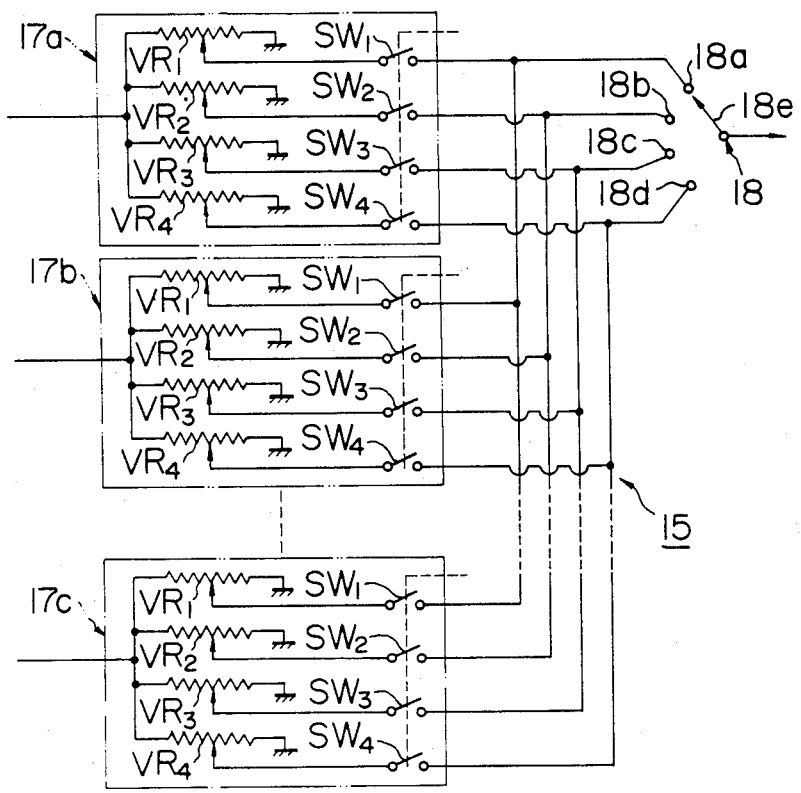
FIG. 4 is a circuit diagram of a halftone dot area rate controller of the device shown in FIG. 3.

In FIG. 4 there is shown one embodiment of the halftone dot area rate controller 15 comprising a plurality of halftone dot area rate setting circuits 17 of the corresponding number to the discriminative colors in hue, detected by the color discriminator 14. Each halftone dot area rate setting circuit 17 comprises a combination of potentiometers $VR_1$–$VR_4$ and analog switches $SW_1$–$SW_4$ which are normally open, of the corresponding number to the colors separated such as Y, M, C and K colors. Thus, the potentiometers $VR_1$–$VR_4$ and the analog switches $SW_1$–$SW_4$ correspond to the Y, the M, the C and the K plates, respectively.

One fixed terminals of the potentiometers $VR_1$–$VR_4$ are connected to one of the output terminals of the color discriminator 14, and the other fixed terminals are connected to the ground. Slidable terminals of the potentiometers $VR_1$–$VR_4$ are coupled to one terminals of the analog switches $SW_1$–$SW_4$. The other terminals of the analog switches $SW_1$–$SW_4$ are linked to select terminals 18a–18d of a turn switch 18, and a common terminal 18e of the turn switch 18 is connected to the brightness controller 16. All the analog switches $SW_1$–$SW_4$ in each halftone dot area rate setting circuit 17 are automatically closed depending on the output signal of the color discriminator 14.

The operation for preparing the Y plate for the original picture 1' by using the device according to the present invention will be described.

The original picture 1' and the recording film 8 are mounted to the picture cylinder 6 and the recording cylinder 7, respectively, and the halftone contact screen 9 is mounted to the recording cylinder 7 so as to cover the recording film 8 entirely.

Then, the turn switch 18 is rotated so that the common terminal 18e may be connected to the select terminal 18a for yellow. Then, the potentiometers $VR_1$ of the halftone dot area rate setting circuits 17a, 17b and 17c are adjusted so that the halftone dot area rates of the bill part 1a', the head and the body parts 1b' and 1c', and the cap part 1d' of the original picture 1' may be 90%, 30% and 50% predetermined, and the potentiometers $VR_1$ of the other halftone dot area rate setting circuits (not shown) are adjusted so that the halftone dot area rates of the other parts such as 1e', may be 0%.

Then, the present device of FIG. 3 is started to operate. In this embodiment, when the pickup head 12 scanns the white ground color part, the tassel part 1e', and the wing parts of the original picture 1', the color discriminator 14 does not output any signal, and hence all the analog switches $SW_1$–$SW_4$ are open. Accordingly, no signal is output to the common terminal 18e of the turn switch 18, and thus the recording film 8 is not exposed by the exposure head 13.

When the pickup head 12 scanns the bill part 1a' of the original picture 1' along a scanning line 19, the color discriminator 14 discriminates the Y color and the analog switches $SW_1$–$SW_4$ of the halftone dot area rate setting circuit 17a for the Y plate are closed. Therefore, only the output signal corresponding to the halftone dot area rate of 90% settled, in advance, by the potentiometer $VR_1$ is input to the brightness controller 16 via the turn switch 18. The brightness controller 16 controls the brightness depending on the halftone dot area rate of 90%. Thus, the exposure head 13 exposes the recording film 8 at the brightness corresponding to the halftone dot area rate of 90% of yellow, which is determined in the bill part 1a'.

When the pickup head 12 scanns the head part 1b' of the original picture 1' along a scanning line 20, the color discriminator 14 discriminates the R color and the analog switches $SW_1$–$SW_4$ of the halftone dot area rate setting circuits 17b for the R plate are closed. Hence, only the output signal corresponding to the halftone dot area rate of 30% settled by the potensiometer $VR_1$ is input to the brightness controller 16 via the turn switch 18. Then, the exposure head 13 exposes the recording film 8 at the brightness corresponding to the halftone dot area rate of 30% of yellow, which is determined in the head part 1b'.

Then, when the pickup head 12 scanns the bill part 1a' along the scanning line 20, the recording film 8 is exposed at the brightness corresponding to the halftone dot area rate of 90% of yellow, in the same manner as described above.

Next, when the pickup head 12 scanns the tassel part 1e' of the original picture 1' along a scanning line 21, the color discriminator 14 does not discriminate any color because the color discriminator 14 only discriminates the Y, the R and the B colors, and the potentiometers $VR_1$ of the halftone dot area rate setting circuit 17 (not shown) for the tassel part 1e' is set so that the halftone dot area rate may be 0%, as described above. Accordingly, on this occasion, in spite of the fact that the analog switches $SW_1$–$SW_4$ of the halftone dot area rate setting circuit 17 for the tassel part 1e' are closed, the output signal corresponding to the halftone dot area rate of 0% is fed to the brightness controller 16 via the turn switch 18, and thus the recording film 8 is not exposed by the exposure head 13.

It is readily understood from the above description that the exposure head 13 only exposes the parts including the Y color components of the recording film 8 at the predetermined halftone dot area rates, thereby obtaining the Y plate for plate making.

Then, the M plate for the original picture 1' is prepared in the same manner as described above, except that the common terminal 18e of the turn switch 18 is connected to the select terminal 18b so that the brightness of the parts including the magenta components may be controlled depending on the halftone dot area rates determined by the potentiometers $VR_2$ of the halftone dot area rate setting circuits 17, and that the screen angle of the halftone contact screen 9 is changed at a certain angle from the above case so that the moire phenomenon may not occur.

Then, the C plate and the K plate for the original picture 1' are produced in the same manner as described above.

Although the present invention has been described with reference to a preferred embodiment thereof, however, various changes and modifications can be made by those skilled in the art without departing from the scope of the present invention.

For example, the number of the potentiometer VR and the analog switch SW of each halftone dot area rate setting circuit 17 can be one, and the turn switch 18 can be omitted. In this embodiment, however, the potensiometer of each halftone dot area rate setting circuit 17 is adjusted depending on the halftone dot area rate of each part for preparing each plate.

According to the present invention, when the exposure means provided with a conventional halftone dot producer is used, the contact screens covering the recording film can be omitted. Further, according to the present invention, instead of the picture cylinder and the recording cylinder flat picture and recording plates can be applied and four plates for yellow, magenta, cyan and black colors can be prepared at the same time, as disclosed in Japanese Patent Publication No. 52-18601 corresponding to U.S. patent application Ser. No. 337,448, filed Mar. 2, 1978.

What is claimed is:

1. A tint laying device for use in a picture reproducing machine, comprising:
   (a) a pickup head which scanns an original picture and picks up a picture signal;
   (b) a color discriminator which receives the picture signal output from the pickup head, and discriminates a color in hue of the picture signal to output a discrimination signal;
   (c) a halftone dot area rate controller which receives the discrimination signal fed from the color discriminator, and outputs a signal corresponding to a halftone dot area rate predetermined of a halftone dot to be recorded, per each color;
   (d) an exposure amount controller which varies the halftone dot area rate of the halftone dot depending on the signal output from the halftone dot area rate controller; and
   (e) an exposure head which scanns a recording film and records a reproduction picture thereon according to the halftone dot area rate in synchronization with the pickup head.

2. A device as defined in claim 1, wherein the recording film is covered by a halftone contact screen.

3. A device as defined in claim 1 or 2, wherein the halftone dot area rate controller comprises a plurality of halftone dot area rate setting circuits of the corresponding number to the discriminative colors in hue detected by the color discriminator.

4. A tint laying device for use in a picture reproducing machine, comprising:
   (a) a pickup head which scanns an original picture and picks up a picture signal;
   (b) a color discriminator which receives the picture signal output from the pickup head, and discriminates a color in hue of the picture signal to output a discriminator signal, one of the output terminals of said color discriminator is connected to one of the fixed terminals of potentiometers;
   (c) a halftone dot area rate controller which receives the discrimination signal fed from the color discriminator, and outputs a signal corresponding to a halftone dot area rate predetermined of a halftone dot to be recorded, per each color;
   (d) an exposure amount controller which varies the halftone dot area rate of the halftone dot depending on the signal output from the halftone dot area rate controller; and
   (e) an exposure head which scans a recording film and records a reproduction picture thereon according to the halftone dot area rate in synchronization with the pickup head.

* * * * *